United States Patent
Charns

[15] 3,671,714
[45] June 20, 1972

[54] HEATED BLOWER MOTOR FOR DEFROSTING WINDOWS

[72] Inventor: Norman Charns, Southfield, Mich.
[73] Assignee: General Motors Corporation, Detroit, Mich.
[22] Filed: Oct. 5, 1970
[21] Appl. No.: 77,798

[52] U.S. Cl..........................219/203, 219/10.49, 219/369, 219/375, 310/62, 310/112, 310/211
[51] Int. Cl. .......................................H05b 3/02, F24h 3/04
[58] Field of Search .......................219/373-376, 10.49, 219/10.51, 10.65, 203, 369-371; 310/112, 113, 211, 212, 62

[56] References Cited

UNITED STATES PATENTS

| | | | |
|---|---|---|---|
| 1,996,460 | 2/1935 | Coates | 310/62 |
| 718,697 | 1/1903 | Chesney | 310/211 |
| 1,508,735 | 9/1924 | Weiss | 219/369 |
| 527,050 | 10/1894 | Collins | 219/370 |
| 2,675,588 | 4/1954 | Simons et al. | 219/370 UX |
| 3,524,044 | 8/1970 | Liardi | 219/203 |
| 2,549,362 | 4/1951 | Bessiere et al. | 219/10.51 |

Primary Examiner—A. Bartis
Attorney—William S. Pettigrew and John C. Evans

[57] ABSTRACT

An electric motor driven blower adapted to defrost an automobile window and having inlets and outlets in opposite ends of the motor casing to direct air through the interior of the motor past the motor armature. The air is warmed during passage by contact with a plurality of electrically isolated closed loops of conductive material mounted in circumferentially spaced, axially directed slots on the armature. Hysteresis heat losses are produced in the loops by the movement of the closed loops through the motor's magnetic field. A fan and duct at one end of the motor direct the warmed air against the automobile window for defrosting.

2 Claims, 6 Drawing Figures

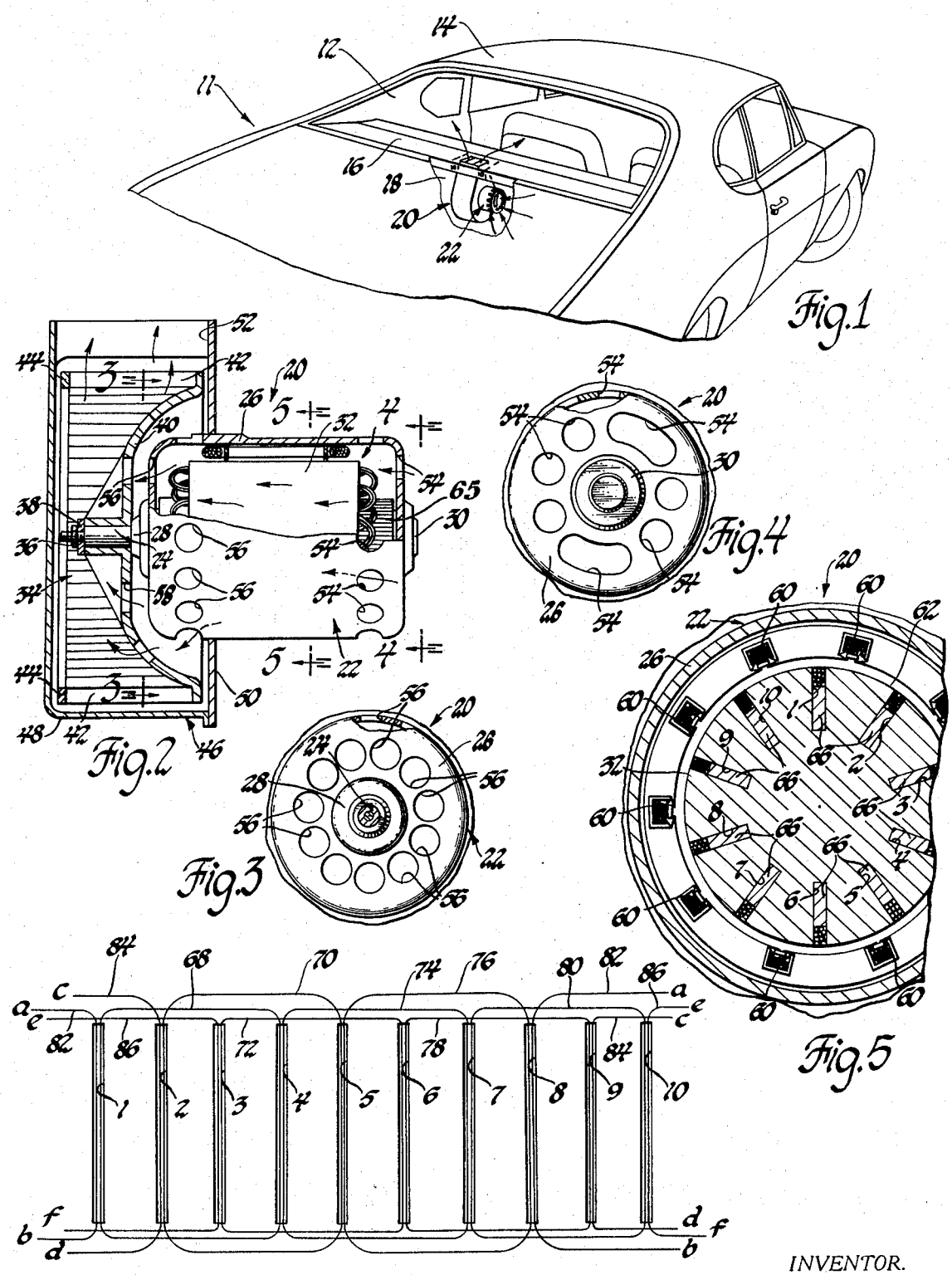

HEATED BLOWER MOTOR FOR DEFROSTING WINDOWS

This invention relates to window defrosters for automobiles.

Previously, automobile windows have been defrosted by heating passenger compartment air in a conventional engine coolant heater. This heater is warmed by passing hot engine coolant through a heat exchanger located adjacent the vehicle fire wall. Although defrosting in this manner has generally been successful, a number of drawbacks are evident. Obviously, this type of defroster is limited to use with liquid cooled automobile engines. Furthermore, in conventional front engine automobiles the engine coolant heater is located far from the rear window of the automobile and therefore is not a desirable heat source for its defrosting.

A delay between the time the engine is first started until the engine coolant is warmed is probably the most undesirable consequence with engine coolant heated defrosters. During this period, heat is unavailable for defrosting. This is often the time when maximum defrosting capacity is desirable.

The subject electric motor driven blower utilizes the heat produced by electric current in the blower motor to warm air for defrosting the window. More particularly, the motor has a plurality of closed loops of wire supported on its armature which move with the armature through the magnetic field produced by the field windings to generate hysteresis heat losses. Inlets and outlets on opposite ends of the motor casing conduct air through the interior of the motor past the closed loops of wire for heating the air which is subsequently directed against the window.

Therefore, an object of the inventor in the present invention is to provide a compact window defroster for automobiles whose heat source is an electric motor which rotates a fan.

A further object of the inventor in the present invention is to provide an electric motor driven window defroster for automobiles having closed loops of wire supported by the motor armature which move with the armature through the magnetic field produced by the motor field winding to produce hysteresis heat losses utilized to warm air for window defrosting.

Other objects and advantages of the present invention will be apparent from the following detailed description reference being had to the accompanying drawings wherein a preferred embodiment of the present invention is clearly shown.

IN THE DRAWINGS

FIG. 1 is a perspective view of the rear window of an automobile and the subject window defroster;

FIG. 2 is a vertical view of the defroster broken away to better reveal the motor's interior;

FIG. 3 is an end sectional view taken along line 3—3 in FIG. 2;

FIG. 4 is an end sectional view taken along section line 4—4 in FIG. 2;

FIG. 5 is a vertical sectional view taken along section line 5—5 in FIG. 2;

FIG. 6 is a schematic illustration of the closed loops of wire on the armature shown in FIG. 5.

In FIG. 1 of the drawings, the rear portion of an automobile 11 is illustrated. Automobile 11 includes a rear window or backlight 12 which covers an opening in the rearward portion of roof 14. A package shelf 16 within the interior 18 of the automobile is located adjacent rear window 12 and behind the rear seat back. A motor driven blower assembly 20 is supported beneath the package shelf 16 to heat and discharge air against rear window 12 as shown by the arrows which represent air flow.

The blower assembly 20 is more particularly shown in FIG. 2 and includes an electric motor 22. Motor 22 has a rotatable shaft 24 supported for rotation within a motor casing 26 by bearings 28 and 30. A cylindrical armature 32 is coaxially affixed to shaft 24 for rotation together within casing 26.

Shaft 24 protrudes through the motor casing 26 and is affixed to a squirrel cage blower fan 34 by a nut 36 and washer 38 on the shaft. The blower fan 34 includes a central hub portion 40 which encircles shaft 24. On the periphery of hub portion 40 a plurality of blades 42 extend axially toward an integrally formed stiffening ring 44.

Blower fan 34 is rotated within a hollow duct 46 formed between a cup-shaped member 48 and a flat member 50. Member 50 is apertured to encircle one end of motor casing 26.

As shown in FIGS. 1 and 2, duct 46 includes a circular portion in which blower fan 34 rotates and a tangential discharge portion 52 which directs air against the rear window 12 of automobile 11. Air is drawn into the blower fan 34 through a plurality of air inlet ports 54 in one end of motor casing 26 as seen in FIGS. 2, 3, 4. The air then passes through the interior of motor casing 26 and through a plurality of air outlet ports 56 in another end of the motor casing 26. From outlets 56, air flows through openings 58 in the central hub portion 40 of fan 34 and radially outward through portion 52 of duct 46.

The electric motor 22, shown in FIG. 5, is the universal AC type which can be run on AC or DC current. Field windings 60 are supported by the motor casing 26 about the armature 32. An annular flow passage 62 between armature 32 and motor casing 26 passes air from the inlets 54 to the outlets 56. Ten circumferentially spaced, axially directed slots 1–10 are shown in the periphery of armature 32. Bars 66 of conductive material extend axially within the slots and are connected to a commutator 65 for carrying electric current. Coaction between the current through bars 66 and the electromagnetic field produced by current in the field windings 60 causes rotation of the armature 32 within motor casing 26.

Armature 32 includes a number of separate wire loops which rotate with the armature but are insulated from it. These wire loops extend through alternate pairs of slots as shown in FIGS. 5 and 6 and each loop may include a plurality of turns. The opposite ends of each loop are joined together to form 10 closed wire loops insulated from the armature.

In FIG. 6 the wiring of armature 32 is illustrated schematically to better show the 10 separate loops. For simplicity, only one turn for each loop is shown. One closed loop 68 extends through slot 1 in armature 32, bypasses slots 2 and 3 and extends through slot 4 and back to slot 1. Another loop 70 extends through slot 2, bypasses slots 3 and 4 and extends through slot 5 and back to slot 2. Loop 72 extends through slot 3, bypasses slots 4 and 5 and extends through slot 6 and back to slot 3. Loop 74 extends through slot 4, bypasses slots 5 and 6, extends through slot 7 and back to slot 4. Loop 76 extends through slot 5, bypasses slots 6 and 7, extends through slot 8 and back to slot 5. Loop 78 extends through slot 6, bypasses slots 7 and 8, extends through slot 9 and back to slot 6. Loop 80 extends through slot 7, bypasses slots 8 and 9, extends through slot 10 and back to slot 7. A loop 82 extends through slot 8, bypasses slots 9 and 10, extends through slot 1 and back to slot 8. For illustration in FIG. 6, the ends of loop 82 are labeled $a$ and $b$. A loop 84 extends through slot 9, bypasses slots 10 and 1, extends through slot 2 and back to slot 9. The ends of loop 84 are labeled $c$ and $d$. A loop 86 extends through slot 10, bypasses slots 1 and 2, extends through slot 3 and back to slot 10. The ends of loop 86 are labeled $e$ and $f$.

As the armature 32 rotates, the closed loops 68, 70, 72, 74, 76, 78, 80, 82, 84 and 86 cut through the magnetic field created by electric current through field windings 60. This motion of the loops through the magnetic field induces an electric current through the closed loops. Because the loops are shorted into closed circuits without an electrical load and are insulated from said armature, hysteresis losses in the form of heat energy are generated. This release of heat energy from the loops warms air flowing past the armature from inlets 54 to outlets 56 and into the blower fan 34. The warmed air is directed by portion 52 of duct 46 onto the rear window 12 of the automobile for defrosting purposes.

It should be understood that the selection of 10 armature slots was arbitrary and any number could have been selected. Also, the number and placement of the field windings 60 may be altered to produce desirable motor operation. Although a universal type AC motor is illustrated, the present invention lends itself to shunt, series and compound DC electric motors. With armature slots formed in the armature, an AC split phase or condensor motor would also operate to warm air for defrosting purposes when wired in accordance with the present invention.

While the embodiment of the invention as herein described constitutes a preferred form, other forms may be adapted.

What is claimed is:

1. A combination blower and electric motor for directing heated air against the inside surface of an automobile windshield for defrosting comprising: an electric motor with a rotatable shaft supported within a casing; an armature attached to said shaft for rotation together within said motor casing; means supported by said casing radially outward from said armature for producing a magnetic field which extends across said armature; means supported by said rotatable armature for conducting electric current whereby the interaction between said magnetic field and said electric current through said conductive means causes said armature and shaft to rotate within said casing; blower fan means attached to one end of said motor shaft for rotation therewith; air inlet openings and outlet openings in opposite ends of said motor casing; duct forming means attached to one end of said motor casing around said fan means and said outlet openings for causing air to flow from the automobile interior, through said inlet openings, past said armature and through said outlet openings into said blower means; said duct means supported adjacent the inside surface of an automobile window for directing air from said blower against the window; said armature having circumferentially spaced and axially directed slots therein; conductors in said slots insulated from said armature; means connecting the ends of the conductors in pairs of circumferentially spaced slots to form a plurality of separate conductive loops insulated from said armature and from each other; said loops being rotated by said armature through said magnetic field whereby electric current is induced in said loops to produce hysteresis heat loss which warms the air flowing between said inlet and outlet openings.

2. A combination blower and electric motor for directing heated air against the inside surface of an automobile window for defrosting comprising: an electric motor with a rotatable shaft supported within a casing; an armature attached to said shaft for rotation together within said motor casing; means supported by said casing radially outward from said armature for producing a magnetic field which extends across said armature; conductive means supported by said rotatable armature for conducting electric current whereby the interaction between said magnetic field and said electric current through said conductive means causes said armature and shaft to rotate within said casing; blower fan means attached to one end of said motor shaft for rotation therewith; air inlet openings and outlet openings in opposite ends of said motor casing; duct forming means attached to one end of said motor casing around said fan means and said outlet openings for causing air to flow from the automobile interior, through said inlet openings, past said armature and through said outlet openings into said fan means; said duct means supported adjacent the inside surface of an automobile window for directing air from said blower against the window; said armature having circumferentially spaced and axially directed slots therein; separate loops of conductive material on said armature formed by wire wrapped through pairs of circumferentially spaced slots in said armature; said separate loops being insulated from said armature and from each other whereby when said loops are rotated with said armature through said magnetic field, rapidly alternating electric current is induced in said loops which produces hysteresis heat for warming air flowing between said inlet and outlet openings.

* * * * *